United States Patent
Sandell et al.

(10) Patent No.: US 10,728,081 B1
(45) Date of Patent: Jul. 28, 2020

(54) WIDEBAND TX IQ IMBALANCE ESTIMATION

(71) Applicant: Kabushiki Kaisha Toshiba, Minato-ku (JP)

(72) Inventors: Magnus Stig Torsten Sandell, Bristol (GB); Evgeny Tsimbalo, Bristol (GB); Ichiro Seto, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/354,935

(22) Filed: Mar. 15, 2019

(51) Int. Cl.
*H04L 27/26* (2006.01)
*H04L 27/38* (2006.01)
*H04L 27/36* (2006.01)
*H04L 27/00* (2006.01)

(52) U.S. Cl.
CPC ...... *H04L 27/3863* (2013.01); *H04L 27/0014* (2013.01); *H04L 27/2657* (2013.01); *H04L 27/364* (2013.01); *H04L 2027/004* (2013.01); *H04L 2027/0042* (2013.01)

(58) Field of Classification Search
CPC ............. H04L 27/3863; H04L 27/0014; H04L 27/2657; H04L 27/364; H04L 2027/0042; H04L 2027/004
See application file for complete search history.

(56) References Cited

U.S. PATENT DOCUMENTS

| | | | | |
|---|---|---|---|---|
| 8,532,237 B2 * | 9/2013 | Shaked | ............... | H04L 27/3863 327/551 |
| 10,116,485 B1 * | 10/2018 | Liu | ........................ | H04B 17/17 |
| 2005/0276354 A1 * | 12/2005 | Su | ....................... | H04L 27/3863 375/326 |
| 2010/0166049 A1 * | 7/2010 | Ahirwar | ................... | H04B 1/28 375/221 |
| 2010/0272208 A1 * | 10/2010 | Feigin | ..................... | H04B 1/28 375/268 |
| 2011/0069767 A1 | 3/2011 | Zhu | | |
| 2013/0273834 A1 * | 10/2013 | Sundstrom | ............. | H04B 7/155 455/7 |

(Continued)

FOREIGN PATENT DOCUMENTS

CA 2 793 034 A1 9/2011

OTHER PUBLICATIONS

Hai Lin, et al. "Low-Complexity Pilot-Aided Compensation for Carrier Frequency Offset and I/Q Imbalance" IEEE Transactions on Communications, vol. 58, No. 2, Feb. 2010, pp. 448-452.

(Continued)

*Primary Examiner* — Dac V Ha
(74) *Attorney, Agent, or Firm* — Oblon, McClelland, Maier & Neustadt, L.L.P.

(57) ABSTRACT

A computer-implemented method of estimating IQ imbalance in a communication system including a transmitter and a receiver. The method includes: defining a system model in which a transmitted signal is affected by TX IQ imbalance, carrier frequency offset (CFO) and RX IQ imbalance; controlling a local oscillator at the transmitter to introduce a known carrier frequency offset (CFO) during a calibration; and estimating unknown parameters in the system model using a pre-defined training sequence to determine the TX IQ imbalance and the RX IQ imbalance.

17 Claims, 3 Drawing Sheets

(56) References Cited

U.S. PATENT DOCUMENTS

2015/0280958 A1* 10/2015 Yu .................... H04L 27/364
375/222
2015/0365263 A1* 12/2015 Zhang ................ H04L 1/0057
375/295

OTHER PUBLICATIONS

Fenfang Wu, et al., "Estimation of TX I/Q Imbalance at the RX side with RX I/Q Imbalance and Carrier Frequency Offset for OFDM Systems" IEEE, 2014 IEEE Globecom Workshops, 2014, pp. 960-965.

* cited by examiner

WIDEBAND TX IQ IMBALANCE ESTIMATION

FIELD

Embodiments described herein relate generally to a method of estimating IQ imbalance in a communication system.

BACKGROUND

A practical limitation in radio frequency (RF) wireless communication systems results from a mismatch between an in-phase (I) and quadrature (Q) phase component of a carrier signal, which is known as IQ imbalance. The carrier signal typically carries two independent bit streams, one on each of the in-phase (I) and quadrature (Q) components and these become imbalanced due to hardware imperfections encountered during signal processing. For example, a filter may introduce a phase shift or change in amplitude for one component but not the other. The resulting imbalance must be compensated for in order to achieve good performance. This is especially true for wideband systems, where the IQ imbalance becomes frequency dependent and needs to be carefully estimated in order to be compensated for.

In a communication system, transmitters (TX) and receivers (RX) will each give rise to an IQ imbalance and, in order to compensate for these, both the TX IQ imbalance and the RX IQ imbalance need to be estimated individually. However it is difficult to separate them as a received signal will have been affected by both the TX IQ imbalance and the RX IQ imbalance. This is especially difficult in light of carrier-frequency offset (CFO) which is always present in such systems due to a frequency mismatch between the transmitter and receiver oscillators.

It is known to transmit a particular periodic training sequence such that the RX IQ imbalance and CFO can be estimated and compensated for. After that, the TX IQ imbalance can be estimated from the compensated signal. However, a problem with existing schemes is that if the CFO is small (or zero), there will be a significant noise enhancement and known algorithms will not be able to accurately separate the IQ imbalance coming from the transmitter from that of the receiver.

Arrangements of certain embodiments will be understood and appreciated more fully from the following detailed description, made by way of example only and taken in conjunction with the drawings in which.

DETAILED DESCRIPTION

According to an embodiment there is provided a computer-implemented method of estimating IQ imbalance in a communication system comprising a transmitter and a receiver, the method comprising:

defining a system model in which a transmitted signal is affected by TX IQ imbalance, carrier frequency offset (CFO) and RX IQ imbalance;

controlling a local oscillator at the transmitter to introduce a known carrier frequency offset (CFO) during a calibration step; and estimating unknown parameters in the system model using a pre-defined training sequence to determine the TX IQ imbalance and the RX IQ imbalance.

The method may be applied to a multichannel communication system and the system model may further define an inter-channel interference. More specifically, a channel may correspond to a data stream transmitted in a same time and frequency slot. Thus, different channels could comprise different spatial streams (e.g. transmitted from different antennas) or different polarisation streams (e.g. transmitted using a different polarisation from a same (or different) antenna).

The pre-defined training sequence may comprise non-overlapping training symbols.

The step of estimating the unknown parameters may comprise using a least-squares estimation method.

The CFO may be chosen to provide a relative frequency offset of at least 0.001, at least 0.005 or at least 0.05.

The TX IQ imbalance may be defined as $$y_{k,l}(i) = \alpha_k^{(T)}(i)x_{k,l}(i) + \beta_{-k}^{(T)*}(i)x_{-k,l}^*(i)$$

where k indicates a subcarrier, l indicates a time index (i.e. an index of the OFDM symbols in the time direction), i=1, ..., $N_{tx}$ is a transmit channel index and $\alpha_k^{(T)}$, $\beta_k^{(T)}$ are IQ imbalance coefficients at the transmitter.

The system model may further comprise an inter-channel interference defined as $$z_{k,l}(m) = \sum_{i=1}^{N_{tx}} h_k(m, i)y_{k,l}(i)$$

where k indicates a subcarrier, l indicates a time index, i=1, ..., $N_{tx}$ is a transmit channel index, m=1, ..., $N_{rx}$ is a receive channel index and h is a channel coefficient.

The CFO may be defined as $$w_{k,l}(m) = e^{j\phi l}z_{k,l}(m)$$

where k indicates a subcarrier, l indicates a time index, m=1, ..., N is a receive channel index and φ represents a phase shift caused by the CFO.

The RX IQ imbalance may be defined as $$r_{k,l}(m) = \alpha_k^{(R)}(m)w_{k,l}(m) + \beta_{-k}^{(R)*}(m)w_{-k,l}^*(m)$$

where k indicates a subcarrier, l indicates a time index, m=1, ..., $N_{rx}$ is a receive channel index and $\alpha_k^{(R)}$, $\beta_k^{(R)}$ are IQ imbalance coefficients at the receiver.

The system model may be defined as $$r_{k,l} = (e^{j\phi l}A_k + e^{-j\phi l}B_k)x_{k,l} + (e^{j\phi l}C_k + e^{-j\phi l}D_k)x_{-k,l}^*$$

where $r_{k,l}$ is a $N_{rx} \times 1$ vector, $A_k$, $B_k$, $C_k$, $D_k$ are $N_{rx} \times N_{tx}$ matrices and $x_{k,l}$ is a $N_{tx} \times 1$ vector.

The matrices may be defined as:

$$A_k(m, i) = h_k(m, i)\alpha_k^{(T)}(i)\alpha_k^{(R)}(m)$$

$$B_k(m, i) = h_{-k}^*(m, i)\beta_k^{(T)}(i)\beta_{-k}^{(R)*}(m)$$

$$C_k(m, i) = h_k(m, i)\beta_{-k}^{(T)*}(i)\alpha_k^{(R)}(m)$$

$$D_k(m, i) = h_{-k}^*(m, i)\alpha_{-k}^{(T)*}(i)\beta_{-k}^{(R)*}(m)$$

The TX IQ imbalance may be obtained from $$\frac{C_k(m, i)}{A_k(m, i)} = \frac{\beta_{-k}^{(T)*}(i)}{\alpha_k^{(T)}(i)}$$

The RX IQ imbalance may be obtained from $$\frac{D_k(m, i)}{A_{-k}^*(m, i)} = \frac{\beta_{-k}^{(R)*}(i)}{\alpha_{-k}^{(R)*}(i)}$$

The step of estimating the unknown parameters may comprise estimating the matrices $A_k$, $B_k$, $C_k$, $D_k$ using the pre-defined training sequence wherein $$(r_{k,0} \ldots r_{k,L-1}) =$$

$$(A_k \ B_k \ C_k \ D_k) \begin{pmatrix} e^{j\phi 0}x_{k,0} & e^{j\phi 1}x_{k,1} & \ldots & e^{j\phi(L-1)}x_{k,L-1} \\ e^{-j\phi 0}x_{k,0} & e^{-j\phi 1}x_{k,1} & \ldots & e^{-j\phi(L-1)}x_{k,L-1} \\ e^{j\phi 0}x_{-k,0}^* & e^{j\phi 1}x_{-k,1}^* & \ldots & e^{j\phi(L-1)}x_{-k,L-1}^* \\ e^{-j\phi 0}x_{-k,0}^* & e^{-j\phi 1}x_{-k,1}^* & \ldots & e^{-j\phi(L-1)}x_{-k,L-1}^* \end{pmatrix} R = EM$$

where R is a $N_{rx} \times L$ matrix, E is a $N_{rx} \times 4N_{tx}$ matrix and M is a $4N_{tx} \times L$ matrix.

The method may comprise estimating the matrices $A_k$, $B_k$, $C_k$, $D_k$ using a least-squares estimation method in accordance with $$\hat{E} = RM^H(MM^H)^{-1}$$

where H indicates a complex conjugate transpose.

According to an embodiment there is provided a computer-implemented method of compensating for IQ imbalance in a communication system comprising a transmitter and a receiver, the method comprising:

estimating the IQ imbalance in accordance with the above embodiment;

instructing the transmitter to use the estimated TX IQ imbalance to pre-distort a transmitted signal to remove the effect of the TX IQ imbalance; and instructing the receiver to use the estimated RX IQ imbalance to compensate a received signal to remove the effect of the RX IQ imbalance.

According to an embodiment there is provided a non-transitory computer readable medium comprising instructions operable by a processor to perform any of the above computer-implemented methods.

According to an embodiment there is provided a processor configured to perform any of the above computer-implemented methods.

According to an embodiment there is provided a device comprising the processor defined above. The device may be constituted by a mobile phone base-station, a digital video broadcasting (DVB) transmitter, a wideband wireless transmitter or a millimetre wave point-to-point transmitter.

The above embodiments provide a simple method which artificially introduces a CFO in a calibration phase during which time the IQ imbalance is estimated, thus allowing accurate separation and estimation of both the TX IQ imbalance and the RX IQ imbalance. It has also been found that the embodiments presented are less sensitive to noise in the system.

In a previous approach, the RX IQ imbalance is cancelled by a filter on the quadrature component combined with a fraction of the in-phase component. The CFO is compensated for after the RX IQ imbalance has been cancelled. The filter, fraction and CFO are all estimated using a particular training sequence. Furthermore, a parameter is used to modify a periodic nature of the training sequence to facilitate better estimation. However this basic method is only capable of estimating RX IQ imbalance and CFO, not TX IQ imbalance, which is assumed not to exist. The scheme was expanded to include TX IQ imbalance as well, however, for this method to work, the parameter must be set to zero. This in turn causes a problem when the CFO is small (or even zero) as the noise enhancement will be significant when dividing by a number which is close to zero. Moreover, the previous approach only considers a single channel. In a multichannel system, for example, a multiple input multiple output (MIMO) system, the estimation and compensation method must also take into account inter-channel interference. This will introduce, for example, an IQ imbalance from one channel to another as well as data interference.

In order to estimate an individual TX and RX IQ imbalance, embodiments propose controlling (numerically or otherwise) a local oscillator at the transmitter to artificially introduce a CFO by changing the frequency of the transmitted signal. The proposed method of estimating the IQ imbalance works much better than the previous approach described above since there will be no division by a number close to zero. Accordingly, a suitable CFO can be introduced to facilitate the IQ imbalance estimation without introducing too much interference, such as inter-carrier (or inter-channel) interference (ICI) in an orthogonal frequency division multiplexing (OFDM) system.

Notably, the artificial CFO is only introduced during a calibration phase. When data is transmitted, the artificial CFO is removed to minimise any frequency difference between the transmitter and receiver. The calibration phase may be initiated when a system is powered on and/or at regular intervals to maintain accurate estimates of the IQ imbalance. As the IQ imbalance is quasi-static, it only needs to be estimated very infrequently (e.g. at sparse intervals). Between such intervals, the latest IQ imbalance estimation may be stored in a system file memory such that it can be retrieved and used when required. During normal operation of a communication system, the IQ imbalance at the transmitter can be used for pre-distortion, whereas the IQ imbalance at the receiver can be used for compensation.

Figure 1:
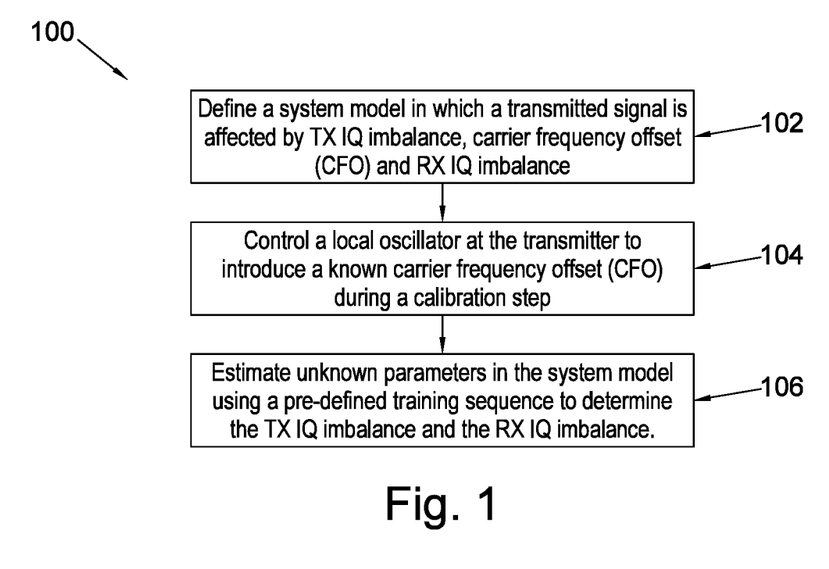
FIG. 1 shows a computer-implemented method of estimating IQ imbalance in a communication system in accordance with an embodiment.

FIG. 1 shows a computer-implemented method 100 of estimating IQ imbalance in a communication system comprising a transmitter and a receiver, in accordance with an embodiment. The method 100 comprises a first step 102 of defining a system model in which a transmitted signal is affected by TX IQ imbalance, carrier frequency offset (CFO) and RX IQ imbalance. The method 100 further comprises a second step 104 of controlling a local oscillator at the transmitter to introduce a known carrier frequency offset (CFO) during a calibration phase. The method 100 then comprises a step 106 of estimating unknown parameters in the system model using a pre-defined training sequence to determine the TX IQ imbalance and the RX IQ imbalance. Further details of particular embodiments employing the method 100 are described in more detail below.

Figure 2:
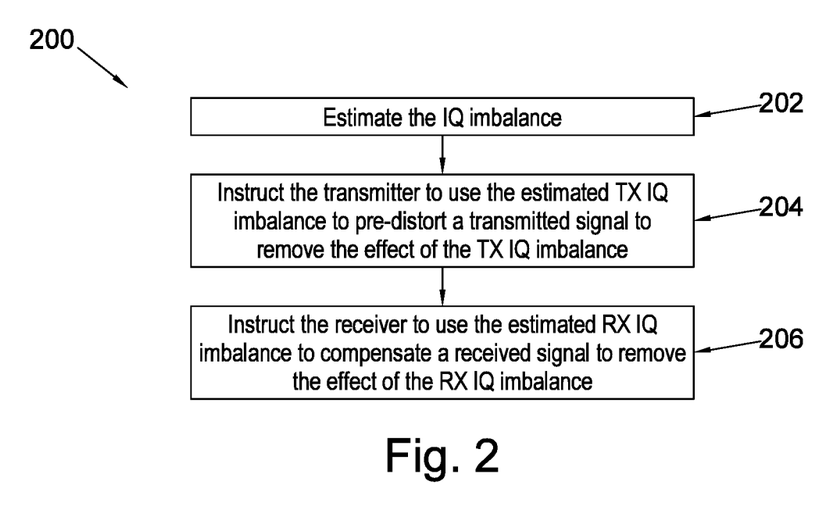
FIG. 2 shows a computer-implemented method of compensating for IQ imbalance in a communication system in accordance with an embodiment.

FIG. 2 shows a computer-implemented method 200 of compensating for IQ imbalance in a communication system comprising a transmitter and a receiver, in accordance with an embodiment. The method 200 comprises a first step 202 of estimating the IQ imbalance in accordance with the method 100. The method 200 further comprises a second step 204 of instructing the transmitter to use the estimated TX IQ imbalance to pre-distort a transmitted signal to remove the effect of the TX IQ imbalance. The method 200 then comprises a step 206 of instructing the receiver to use the estimated RX IQ imbalance to compensate a received signal to remove the effect of the RX IQ imbalance. Further details of particular embodiments employing the method 200 are described in more detail below.

Figure 3:
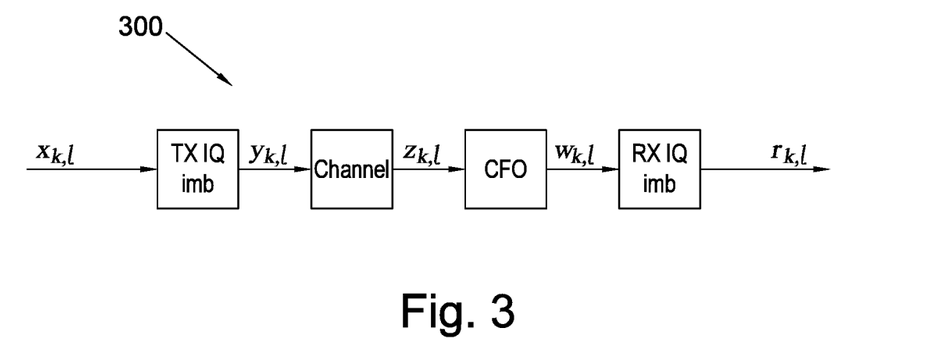
FIG. 3 shows a system model illustrating the processes modifying a signal transmitted by a wireless communication system until after receipt by a receiver, in accordance with embodiments.

FIG. 3 shows a system model 300 illustrating the processes modifying a signal transmitted by a wireless communication system until after receipt by a receiver, in accordance with embodiments. In this case, a multiple channel OFDM system (e.g. having multiple antennas or polarisations) is considered and the basic methods 100 and 200 which are outlined in FIGS. 1 and 2 are expanded upon. As shown in FIG. 3, the system model 300 includes the following impairments (where all signals are considered in the frequency domain with k indicating a subcarrier and l indicating an OFDM time index):

$$\text{TX IQ imbalace } y_{k,l}(i) = \alpha_k^{(T)}(i)x_{k,l}(i) + \beta_{-k}^{(T)*}(i)x_{-k,l}^*(i)$$

$$\text{Inter-channel Interference } z_{k,l}(m) = \sum_{i=1}^{N_{tx}} h_k(m,i)y_{k,l}(i)$$

$$\text{CFO } w_{k,l}(m) = e^{j\phi l}z_{k,l}(m)$$

$$\text{RX IQ imbalance } r_{k,l}(m) = \alpha_k^{(R)}(m)w_{k,l}(m) + \beta_{-k}^{(R)*}(m)w_{-k,l}^*(m)$$

In addition, i=1, . . . , $N_{tx}$ is a transmit channel index, m=1, . . . , $N_{rx}$ is a receive channel index, h is a channel coefficient, φ represents a phase shift caused by the CFO and $a_k^{(\cdot)}$, $\beta_k^{(\cdot)}$ are the IQ imbalance coefficients at the transmitter (T) and receiver(R), respectively. Combining these impairments results in the system model 300 for a MIMO system being:

$$r_{k,l} = (e^{j\phi l}A_k + e^{-j\phi l}B_k)x_{k,l} + (e^{j\phi i}C_k + e^{-j\phi i}D_k)x_{-k,l}^*$$

where $r_{k,l}$ is a $N_{rx} \times 1$ vector, $A_k$, $B_k$, $C_k$, $D_k$ are $N_{rx} \times N_{tx}$ matrices and $x_{k,l}$ is a $N_{tx} \times 1$ vector. The matrices $A_k$, $B_k$, $C_k$, $D_k$ can further be shown to be:

$$A_k(m,i) = h_k(m,i)\alpha_k^{(T)}(i)\alpha_k^{(R)}(m)$$

$$B_k(m,i) = h_{-k}^*(m,i)\beta_{-k}^{(T)}(i)\beta_{-k}^{(R)*}(m)$$

$$C_k(m,i) = h_k(m,i)\beta_{-k}^{(T)*}(i)\alpha_k^{(R)}(m)$$

$$D_k(m,i) = h_{-k}^*(m,i)\alpha_{-k}^{(T)*}(i)\beta_{-k}^{(R)*}(m)$$

Hence if the matrices $A_k$, $B_k$, $C_k$, $D_k$ can be estimated, we can obtain the TX IQ imbalance as $$\frac{C_k(m,i)}{A_k(m,i)} = \frac{\beta_{-k}^{(T)*}(i)}{\alpha_k^{(T)}(i)}$$

and the RX IQ imbalance as $$\frac{D_k(m,i)}{A_{-k}^*(m,i)} = \frac{\beta_{-k}^{(R)*}(i)}{\alpha_{-k}^{(R)*}(i)}$$

The TX IQ imbalance can then be used to pre-distort the transmitted signal $$x'_{k,l}(i) = x_{k,l}(i) - \frac{\beta_{-k}^{(T)*}(i)}{\alpha_k^{(T)}(i)}x_{-k,l}^*(i)$$

since this signal after TX IQ imbalance will not comprise the image component, $x_{-k,l}^*$. Similarly the RX IQ imbalance can be used to compensate the received signal such that $$r'_{k,l}(m) = r_{k,l}(m) - \frac{\beta_{-k}^{(R)*}(m)}{\alpha_{-k}^{(R)}(m)}r_{-k,l}^*(m)$$

to remove the effect of the RX IQ imbalance.

The matrices $A_k$, $B_k$, $C_k$, $D_k$ can be estimated from a pre-defined training sequence. If the signal to be transmitted is known, the matrices can be written on each subcarrier in accordance with $$(r_{k,0} \ldots r_{k,L-1}) =$$

$$(A_k \ B_k \ C_k \ D_k)\begin{pmatrix} e^{j\phi 0}x_{k,0} & e^{j\phi 1}x_{k,1} & \ldots & e^{j\phi(L-1)}x_{k,L-1} \\ e^{-j\phi 0}x_{k,0} & e^{-j\phi 1}x_{k,1} & \ldots & e^{-j\phi(L-1)}x_{k,L-1} \\ e^{j\phi 0}x_{-k,0}^* & e^{j\phi 1}x_{-k,1}^* & \ldots & e^{j\phi(L-1)}x_{-k,L-1}^* \\ e^{-j\phi 0}x_{-k,0}^* & e^{-j\phi 1}x_{-k,1}^* & \ldots & e^{-j\phi(L-1)}x_{-k,L-1}^* \end{pmatrix} R = EM$$

where R is a $N_{rx} \times L$ matrix, E is a $k_{rx} \times 4N_{tx}$ matrix and M is a $4N_{tx} \times L$ matrix. The matrices $A_k$, $B_k$, $C_k$, $D_k$ may be estimated using a least-squares estimation method in accordance with $$\hat{E} = RM^H(mm^H)^{-1}$$

where H indicates a complex conjugate transpose. Thus, in order to find the coefficients in E that minimise the mean-squared error between R (the received signals as observed or measured) and EM (the received signals as expected or calculated based on the pre-defined training sequence), the above equation is employed.

Figure 4:
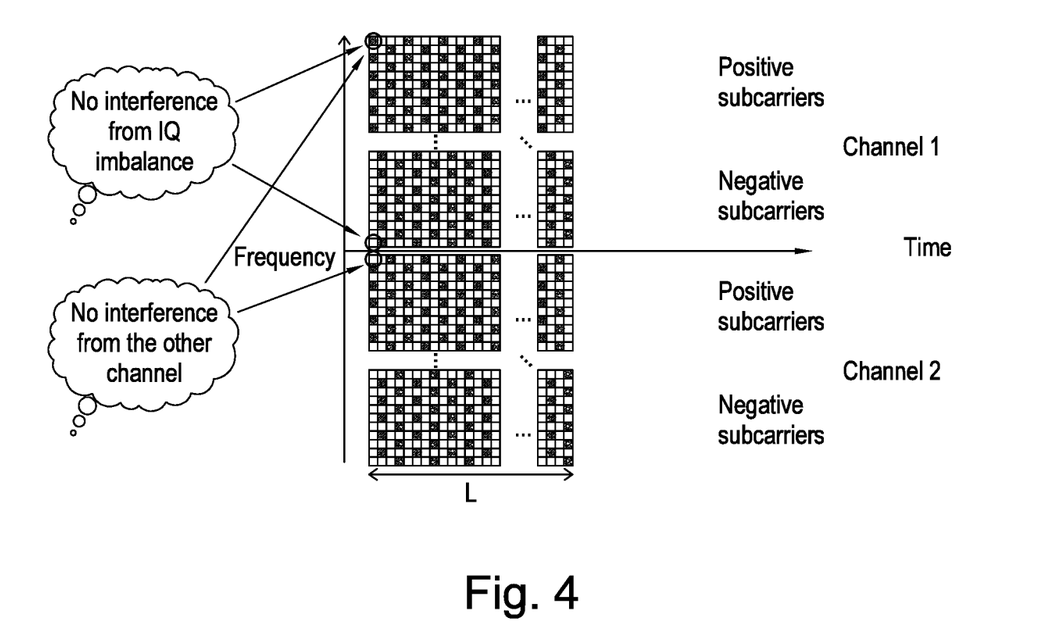
FIG. 4 shows a training sequence for a two-channel system in accordance with an embodiment.

FIG. 4 shows a training sequence for a two-channel system in accordance with an embodiment. This could be expanded to include further channels as required.

In order to achieve high estimation accuracy, it is important that the matrix M is well-conditioned. This can be achieved by using non-overlapping training symbols as illustrated in FIG. 4. More specifically, on channel 1 the positive subcarriers initially have signals present only on the first and every second frequency band thereafter while the negative subcarriers have no signals present. At the same time, on channel 2 the positive subcarriers initially have signals present only in the frequency bands between the signals on channel 1 while the negative subcarriers have no signals present. In the second timeslot or bit the situation is reversed and the positive subcarriers for both channels have no signals present while the negative subcarriers on channel 1 have signals present only on the first and every second frequency band thereafter and the negative subcarriers on channel 2 have signals present only in the frequency bands between the signals on channel 1. This pattern repeats with the channel 2 positive subcarriers having signals present only on the first and every second frequency band thereafter while the negative subcarriers have no signals present. At the same time, on channel 1 the positive subcarriers initially have signals present only in the frequency bands between the signals on channel 2 while the negative subcarriers have no signals present. In the next timeslot or bit the situation is again reversed and the positive subcarriers for both channels have no signals present while the negative subcarriers on channel 2 have signals present only on the first and every second frequency band thereafter and the negative subcarriers on channel 1 have signals present only in the frequency bands between the signals on channel 2. This whole pattern is repeated multiple times to allow each individual signal received to be measured and compared to the signals transmitted so that the unknown parameters in the model can be estimated using the equations defined above.

As shown in FIG. 4 the training sequence does not introduce interference between the 10 subcarriers since only one of the positive and negative subcarriers on each channel are active (i.e. carry a signal/bit) at any point in time. Furthermore, no inter-channel interference is introduced because only one of the channels is active at any point in time. This therefore eliminates such interference during the calibration phase so as to allow the IQ imbalance at the transmitter and receiver to be accurately estimated. A consequence of introducing an artificial CFO during the calibration phase is that a total CFO in the system will be comprised of the artificial CFO as well as an actual CFO (which is always present although it may be close to zero). However, for the purposes of the present embodiments only the total (i.e. combined) CFO is required. The total CFO may be estimated separately or jointly with E by iteratively solving for E assuming $\phi$ is known (i.e. using the artificial CFO introduced by the transmitter local oscillator as explained above) and solving for $\phi$ assuming E is known (for, e.g., a line-search). If the actual CFO was zero ($\phi=0$), the matrix M would be singular since rows 1 and 2 would be identical. Hence it would not be possible to estimate the individual TX and RX IQ imbalance. However, the above described embodiments overcome this by introducing an artificial CFO to make the matrix M non-singular and well-conditioned.

Figure 5:
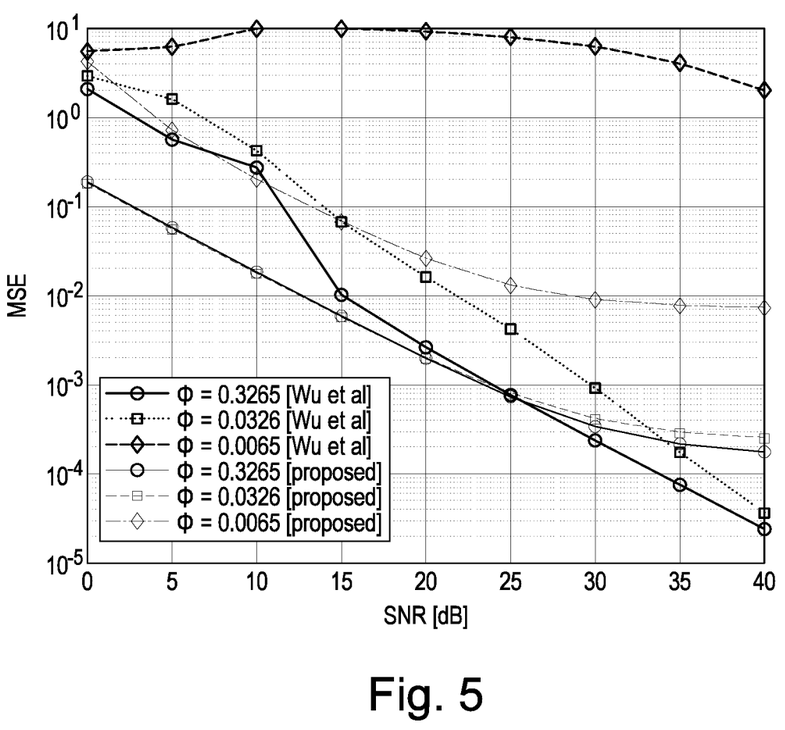
FIG. 5 shows graphically the performance of certain embodiments in calculating TX IQ imbalance compared to a prior art approach for three different CFOs.

FIG. 5 shows graphically the performance of the embodiments described above in calculating TX IQ imbalance compared to a prior art approach as described in Wu, F., Li, Y., & Zhao, M. (2014), Estimation of TX I/Q Imbalance at the RX side with RX I/Q Imbalance and Carrier Frequency Offset for OFDM Systems. *Globecom*, (referred to as Wu), for three different CFOs. In this example, the system model included IQ imbalance, CFO and a frequency-selective channel. The IQ imbalances were set to the same values as in Section IV of Wu and the channel was static with taps[1, 0.5]. The CFO was varied to see its effect.

In FIG. 5 the mean-squared error (MSE) in the estimation of the TX IQ imbalance $$\frac{\beta_{-k}^{(T)*}(i)}{\alpha_k^{(T)}(i)}$$

is shown for different signal to noise ratios (SNR). For a large CFO ($\phi=0.3264$, corresponding to a relative frequency offset of 0.05), both schemes perform well and the MSE is relatively small. When the CFO is reduced to $\phi=0.0326$, corresponding to a relative frequency offset of 0.005, the scheme in (Wu) performs worse while for the proposed embodiment it is essentially the same. For a very small CFO ($\phi=0.0065$, corresponding to a relative frequency offset of 0.001), the scheme i.

(Wu) fails catastrophically whereas the proposed embodiment still offers relevant performance, albeit degraded. These degradations due to small CFOs can be alleviated by introducing an artificial CFO in the calibration phase, as described above in various embodiments. If the actual CFO is known to be small, e.g., using feedback from the receiver, the CFO can be increased to a suitable level to avoid noise enhancement problems.

While certain embodiments have been described, they have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of estimating in-phase and quadrature (IQ) imbalance, the method at least partially performed by electronic circuitry and comprising:
   defining a system model in which a transmitted signal is affected by transmitter IQ (TX IQ) imbalance, carrier frequency offset (CFO) and receiver IQ (RX IQ) imbalance;
   controlling a local oscillator at the transmitter to introduce a known carrier frequency offset (CFO) during a calibration; and
   estimating unknown parameters in the system model using a pre-defined training sequence to determine the TX IQ imbalance and the RX IQ imbalance,
   wherein the CFO is chosen to provide a relative frequency offset of at least 0.001, at least 0.005 or at least 0.05.

2. A method of estimating in-phase and quadrature (IQ) imbalance, the method at least partially performed by electronic circuitry and comprising:
   defining a system model in which a transmitted signal is affected by transmitter IQ (TX IQ) imbalance, carrier frequency offset (CFO) and receiver IQ (RX IQ) imbalance;
   controlling a local oscillator at the transmitter to introduce a known carrier frequency offset (CFO) during a calibration; and
   estimating unknown parameters in the system model using a pre-defined training sequence to determine the TX IQ imbalance and the RX IQ imbalance,
   wherein the TX IQ imbalance is defined as $$y_{k,l}(i) = \alpha_k^{(T)}(i)x_{k,l}(i) + \beta_{-k}^{(T)*}(i)x_{-k,l}^*(i)$$

where k indicates a subcarrier, l indicates a time index, i=1, ..., $N_{tx}$ is a transmit channel index and $\alpha_k^{(T)}$, $\beta_k^{(T)}$ are IQ imbalance coefficients at the transmitter.

3. A method of estimating in-phase and quadrature (IQ) imbalance, the method at least partially performed by electronic circuitry and comprising:

defining a system model in which a transmitted signal is affected by transmitter IQ (TX IQ) imbalance, carrier frequency offset (CFO) and receiver IQ (RX IQ) imbalance;

controlling a local oscillator at the transmitter to introduce a known carrier frequency offset (CFO) during a calibration; and estimating unknown parameters in the system model using a pre-defined training sequence to determine the TX IQ imbalance and the RX IQ imbalance, wherein the system model further comprises an inter-channel interference defined as $$z_{k,l}(m) = \sum_{i=1}^{N_{tx}} h_k(m,i) y_{k,l}(i)$$

where m=1, ..., $N_{rx}$ is a receive channel index and h is a channel coefficient.

4. A method of estimating in-phase and quadrature (IQ) imbalance, the method at least partially performed by electronic circuitry and comprising:

defining a system model in which a transmitted signal is affected by transmitter IQ (TX IQ) imbalance, carrier frequency offset (CFO) and receiver IQ (RX IQ) imbalance;

controlling a local oscillator at the transmitter to introduce a known carrier frequency offset (CFO) during a calibration; and estimating unknown parameters in the system model using a pre-defined training sequence to determine the TX IQ imbalance and the RX IQ imbalance, wherein the CFO is defined as $$w_{k,l}(m) = e^{j\phi l} z_{k,l}(m)$$

where $\phi$ represents a phase shift caused by the CFO.

5. The method of claim 4 wherein the RX IQ imbalance is defined as $$r_{k,l}(m) = \alpha_k^{(R)}(m) w_{k,l}(m) + \beta_{-k}^{(R)*}(m) w_{-k,l}^*(m)$$

where $\alpha_k^{(R)}$, $\beta_k^{(R)}$ are IQ imbalance coefficients at the receiver.

6. The method of claim 5 wherein the system model is defined as $$r_{k,l} = (e^{j\phi l} A_k + e^{-j\phi l} B_k) x_{k,l} + (e^{j\phi l} C_k + e^{-j\phi l} D_k) x_{-k,l}^*$$

where $r_{k,l}$ is a $N_{rx} \times 1$ vector, $A_k, B_k, C_k, D_k$ are $N_{rx} \times N_{tx}$ matrices and $y_{k,l}$ is a $N_{tx} \times 1$ vector.

7. The method of claim 6 wherein the matrices are defined as:

$$A_k(m,i) = h_k(m,i) \alpha_k^{(T)}(i) \alpha_k^{(R)}(m)$$
$$B_k(m,i) = h_{-k}^*(m,i) \beta_k^{(T)}(i) \beta_{-k}^{(R)*}(m)$$
$$C_k(m,i) = h_k(m,i) \beta_{-k}^{(T)*}(i) \alpha_k^{(R)}(m)$$
$$D_k(m,i) = h_{-k}^*(m,i) \alpha_{-k}^{(T)*}(i) \beta_{-k}^{(R)*}(m).$$

8. The method of claim 7 wherein the TX IQ imbalance is obtained from $$\frac{C_k(m,i)}{A_k(m,i)} = \frac{\beta_{-k}^{(T)*}(i)}{\alpha_k^{(T)}(i)}.$$

9. The method of claim 7 wherein the RX IQ imbalance is obtained from $$\frac{D_k(m,i)}{A_{-k}^*(m,i)} = \frac{\beta_{-k}^{(R)*}(i)}{\alpha_{-k}^{(R)*}(i)}.$$

10. The method of claim 7 wherein the step of estimating the unknown parameters comprises estimating the matrices $A_k, B_k, C_k, D_k$ using the pre-defined training sequence wherein $$(r_{k,0} \ \ldots \ r_{k,L-1}) = $$
$$(A_k \ B_k \ C_k \ D_k) \begin{pmatrix} e^{j\phi 0} x_{k,0} & e^{j\phi 1} x_{k,1} & \ldots & e^{j\phi(L-1)} x_{k,L-1} \\ e^{-j\phi 0} x_{k,0} & e^{-j\phi 1} x_{k,1} & \ldots & e^{-j\phi(L-1)} x_{k,L-1} \\ e^{j\phi 0} x_{-k,0}^* & e^{j\phi 1} x_{-k,1}^* & \ldots & e^{j\phi(L-1)} x_{-k,L-1}^* \\ e^{-j\phi 0} x_{-k,0}^* & e^{-j\phi 1} x_{-k,1}^* & \ldots & e^{-j\phi(L-1)} x_{-k,L-1}^* \end{pmatrix} R = EM$$

where R is a $N_{rx} \times L$ matrix, E is a $N_{rx} \times 4N_{tx}$ matrix and M is a $4N_{tx} \times L$ matrix.

11. The method of claim 10 comprising estimating the matrices $A_k, B_k, C_k, D_k$ using a least-squares estimation method in accordance with $$\hat{E} = R M^H (M M^H)^{-1}$$

where H indicates a complex conjugate transpose.

12. A method of compensating for in-phase quadrature (IQ) imbalance in a communication system comprising a transmitter and a receiver, the method comprising:

estimating the IQ imbalance in accordance with claim 1;
instructing the transmitter to use the estimated transmitter IQ (TX IQ) imbalance to pre-distort a transmitted signal to remove the effect of the TX IQ imbalance; and
instructing the receiver to use the estimated receiver IQ (RX IQ) imbalance to compensate a received signal to remove the effect of the RX IQ imbalance.

13. An electronic apparatus comprising a processor and a memory, the processor coupled to the memory and configured to:

define a system model in which a transmitted signal is affected by transmitter in-phase and quadrature (TX IQ) imbalance, carrier frequency offset (CFO) and receiver in-phase and quadrature (RX IQ) imbalance;

control a local oscillator at the transmitter to introduce a known carrier frequency offset (CFO) during a calibration; and estimate unknown parameters in the system model using a pre-defined training sequence to determine the TX TO imbalance and the RX IQ imbalance, wherein the CFO is chosen to provide a relative frequency offset of at least 0.001, at least 0.005 or at least 0.05.

14. The electronic apparatus of claim 13 configured as a mobile phone base-station, a digital video broadcasting (DVB) transmitter, a wideband wireless transmitter or a millimetre wave point-to-point transmitter.

15. An electronic apparatus comprising a processor and a memory, the processor coupled to the memory and configured to:

define a system model in which a transmitted signal is affected by transmitter in-phase and quadrature (TX IQ) imbalance, carrier frequency offset (CFO) and receiver in-phase and quadrature (RX IQ) imbalance;

control a local oscillator at the transmitter to introduce a known carrier frequency offset (CFO) during a calibration; and estimate unknown parameters in the system model using a pre-defined training sequence to determine the TX IQ imbalance and the RX IQ imbalance, wherein the TX IQ imbalance is defined as $$y_{k,l}(i) = \alpha_k^{(T)}(i)x_{k,l}(i) + \beta_{-k}^{(T)*}(i)x_{-k,l}^*(i)$$

where k indicates a subcarrier, l indicates a time index, i=1, ..., $N_{tx}$ is a transmit channel index and $\alpha_k^{(T)}$, $\beta_k^{(T)}$ are IQ imbalance coefficients at the transmitter.

16. An electronic apparatus comprising a processor and a memory, the processor coupled to the memory and configured to:

define a system model in which a transmitted signal is affected by transmitter in-phase and quadrature (TX IQ) imbalance, carrier frequency offset (CFO) and receiver in-phase and quadrature (RX IQ) imbalance;

control a local oscillator at the transmitter to introduce a known carrier frequency offset (CFO) during a calibration; and estimate unknown parameters in the system model using a pre-defined training sequence to determine the TX IQ imbalance and the RX IQ imbalance, wherein the system model further comprises an inter-channel interference defined as $$z_{k,l}(m) = \sum_{i=1}^{N_{tx}} h_k(m, i) y_{k,l}(i)$$

where m=1, ..., $N_{rx}$ is a receive channel index and h is a channel coefficient.

17. An electronic apparatus comprising a processor and a memory, the processor coupled to the memory and configured to:

define a system model in which a transmitted signal is affected by transmitter in-phase and quadrature (TX IQ) imbalance, carrier frequency offset (CFO) and receiver in-phase and quadrature (RX IQ) imbalance;

control a local oscillator at the transmitter to introduce a known carrier frequency offset (CFO) during a calibration; and estimate unknown parameters in the system model using a pre-defined training sequence to determine the TX IQ imbalance and the RX IQ imbalance, wherein the CFO is defined as $$w_{k,l}(m) = e^{j\phi l} z_{k,l}(m)$$

where ϕ represents a phase shift caused by the CFO.

* * * * *